UNITED STATES PATENT OFFICE.

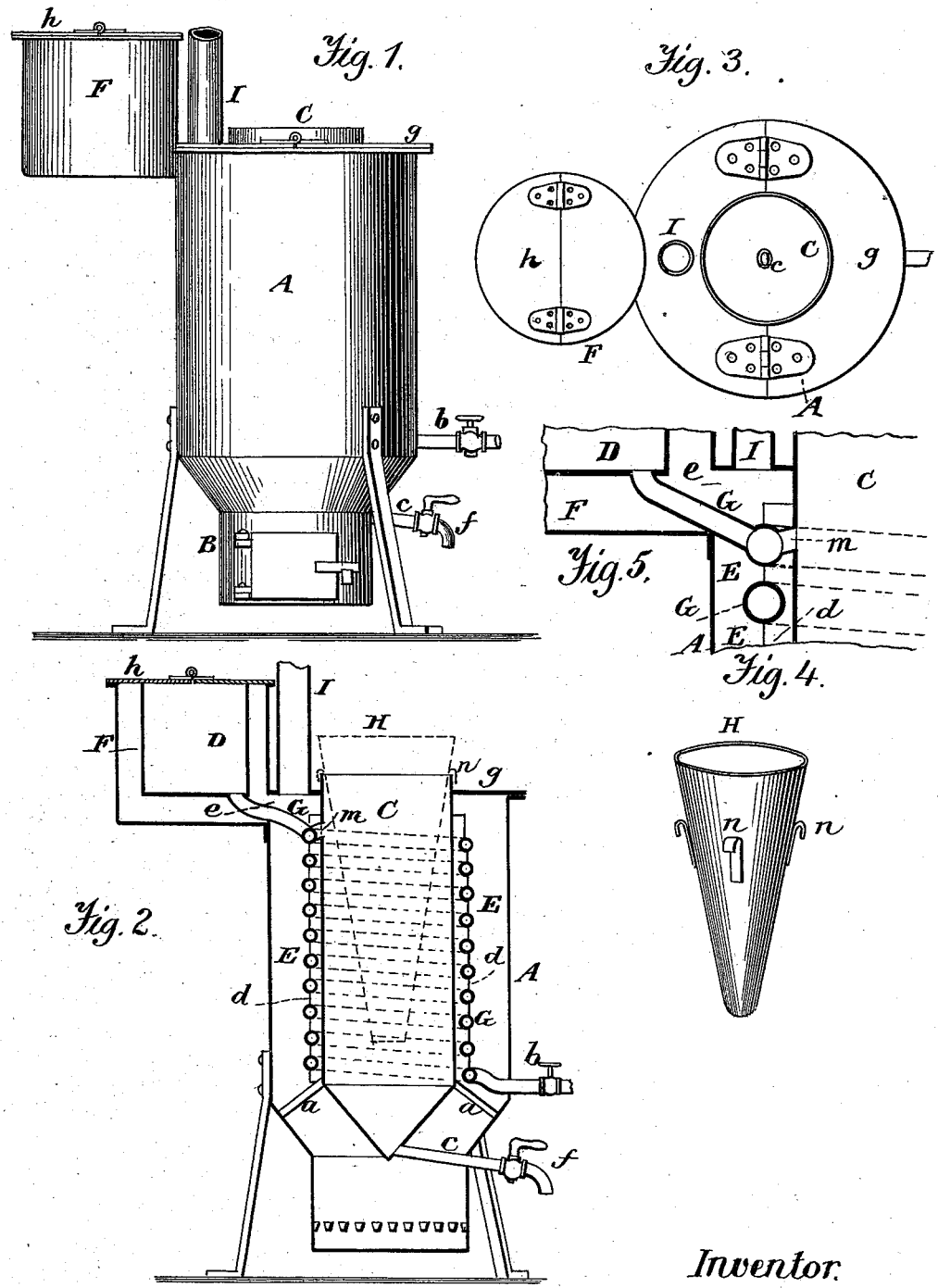

GEORGE LIGHT, OF NARKA, KANSAS.

WATER-HEATING APPARATUS.

SPECIFICATION forming part of Letters Patent No. 402,602, dated May 7, 1889.

Application filed July 30, 1888. Serial No. 281,434. (No model.)

*To all whom it may concern:*

Be it known that I, GEORGE LIGHT, a citizen of the United States, residing at Narka, in the county of Republic and State of Kansas, have invented certain new and useful Improvements in Water-Heating Apparatus; and I do hereby declare the following to be a full, clear, and exact description of the invention, such as will enable others skilled in the art to which it appertains to make and use the same.

This invention relates to water-heating apparatus; and it consists in certain improvements in the construction of the same, as hereinafter described and claimed.

In the accompanying drawings, Figure 1 represents a side view of my improved apparatus. Fig. 2 is a central vertical section of the same. Fig. 3 is a plan or top view. Fig. 4 represents a funnel used in connection with the device; Fig. 5, a detail view showing the connections of two pipes, G E.

A designates the main casing of the heater, the same being cylindrical in form and reduced in diameter at its lower part, where it is provided with a fire-box, B, which is provided with a door and a grate, as shown.

Within the casing A, and supported centrally therein by braces $a$, is a tank, C, which is a few inches less in diameter, and conforms to the casing A, the bottom of said tank being in the form of an inverted cone. An annular heating-chamber, E, rising from the fire-box, is thus formed around the tank C, and extends to the top of the casing A, as shown.

D indicates a small tank which adjoins the main casing at the top, being secured thereto. The tank D is also provided with an outer casing, whereby a hot-air chamber, F, is formed around said tank, there being a hot-air passage, $e$, between chambers E and F.

G indicates a water-pipe, which extends from the tank D into the chamber E, and after being coiled around the central tank, C, a number of times, extends through the casing A, and is provided at its outer end with a faucet, $b$. The coils of pipe G are supported in position by the racks $d$, which are fixed to the casing of tank C. A short pipe, $c$, extends from the bottom of the tank C, and is provided with a faucet, $f$, for drawing the water from said tank as desired.

The heating-chamber E is provided with an annular cover, one half of which is fastened to the casing, the other half forming a lid, $g$, which is provided with hinges, as shown. The heating-chamber F, surrounding the tank D, is covered in a similar manner, and is provided with a lid, $h$.

The tank C has connection near the top, as indicated by $m$, with the pipe G, so that by filling the tank the coiled pipe may be filled without using the tank D, with which said pipe is connected, as is sometimes desirable.

H indicates a funnel, which may be placed in the tank C, with hooks $n$ resting on the top of the tank, as indicated by dotted lines in Fig. 2, the said funnel extending well toward the bottom of the tank. When the tank C is partly filled with heated water, and it is desired to fill the coiled pipe G therefrom, the funnel H is placed in the tank, and water being poured into the funnel is conveyed to the bottom of the tank and causes the heated water to rise and pass into the pipe G, from which it may be drawn through the faucet $b$.

I indicates the smoke-pipe, extending from the top of the combustion-chamber E.

The apparatus is well adapted for various uses—as heating water for stock, mixing feed, and household purposes. The central tank, C, may be used for boiling clothes, and the tank D with pipe G at the same time to contain warm water for other purposes.

The special object of the coil-pipe E, in connection with tank D and pipe G, is to draw warm water in cold weather for the stock to drink while their vegetable or grain food is being cooked in tank C; but when the tank C is not in use for cooking purposes, and hot water is wanted, I can with a small fire heat the water in tank C, so that by introducing feed-water through the funnel the warm water in tank will be forced up and into the coil E. In passing through the coil it will come out boiling, or sufficiently hot for all practical purposes, through the faucet $b$.

What I claim as new, and desire to protect by Letters Patent, is—

A water-heating apparatus formed of the casing A, provided with the fire-box B, the inner and outer tanks, C D, having a pipe-connection and surrounded by connected heating-chambers, the funnel H, supported in tank C, and the coiled pipe G, connected with each tank, surrounding the tank C and having its discharge end extended through the casing, whereby said apparatus may be used, as set forth.

In testimony whereof I have affixed my signature in presence of two witnesses.

GEORGE LIGHT.

Witnesses:
ROBERT FISHER,
JACOB BREINER.